US010377407B2

(12) United States Patent
Pinkelman et al.

(10) Patent No.: US 10,377,407 B2
(45) Date of Patent: Aug. 13, 2019

(54) COOLING SYSTEMS FOR VEHICLE INTERIOR SURFACES

(71) Applicant: Toyota Motor Engineering & Manufacturing North America, Inc., Erlanger, KY (US)

(72) Inventors: Brian J. Pinkelman, Ann Arbor, MI (US); Umesh N. Gandhi, Farmington Hills, MI (US); Shailesh Joshi, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 122 days.

(21) Appl. No.: 15/427,259

(22) Filed: Feb. 8, 2017

(65) Prior Publication Data

US 2018/0222517 A1  Aug. 9, 2018

(51) Int. Cl.

| F28D 17/00 | (2006.01) |
|---|---|
| F28D 19/00 | (2006.01) |
| F28D 15/00 | (2006.01) |
| B62D 1/04 | (2006.01) |
| G05D 1/10 | (2006.01) |
| B62D 1/06 | (2006.01) |
| B60H 1/00 | (2006.01) |
| F28D 20/02 | (2006.01) |

(52) U.S. Cl.
CPC ............. *B62D 1/065* (2013.01); *B60H 1/005* (2013.01); *B60H 1/00292* (2013.01); *F28D 20/02* (2013.01)

(58) Field of Classification Search
CPC .............. F28D 20/025; F28D 20/026; F28D 2020/0008; F28D 2020/0013; B26D 1/065; B60H 1/00492; B60H 1/00292
USPC .................... 165/10, 104.14, 104.17; 74/552
See application file for complete search history.

(56) References Cited

U.S. PATENT DOCUMENTS

| 6,070,657 | A * | 6/2000 | Kunkel | F24H 9/0026 138/157 |
|---|---|---|---|---|
| 6,105,659 | A * | 8/2000 | Pocol | B60H 1/00478 165/10 |
| 7,055,575 | B2 * | 6/2006 | Noel | A61F 7/02 165/10 |
| 2002/0166407 | A1 * | 11/2002 | Germuth-Loffler | B62D 1/065 74/552 |
| 2011/0226440 | A1 * | 9/2011 | Bissell | F28D 20/0039 165/10 |

(Continued)

FOREIGN PATENT DOCUMENTS

CN           202703672 U       1/2013

*Primary Examiner* — Jason N Thompson
(74) *Attorney, Agent, or Firm* — Christopher G. Darrow; Darrow Mustafa PC (57) ABSTRACT

A vehicle component includes a first volume of phase change material and a second volume of phase change material spaced apart from the first volume of phase change material. The first volume of phase change material contains a greater mass of phase change material than the second volume of phase change material. The component also includes a thermally-conductive structure in direct contact with both the first volume of phase change material and the second volume of phase change material, so as to facilitate heat transfer between the first volume of phase change material and the second volume of phase change material.

11 Claims, 6 Drawing Sheets (56) References Cited

U.S. PATENT DOCUMENTS

2014/0182828 A1\* 7/2014 Lekhin .................... F28F 9/013
　　　　　　　　　　　　　　　　　　　　　165/179

\* cited by examiner

COOLING SYSTEMS FOR VEHICLE INTERIOR SURFACES

TECHNICAL FIELD

The present invention relates to vehicle occupant comfort and, more particularly, to a method for cooling interior surfaces of a vehicle which may be in contact with a vehicle occupant.

BACKGROUND

The interior of a vehicle, and particularly surfaces which may be touched by a vehicle occupant or come into contact with the occupant's skin, may heat significantly due to sunlight streaming through the vehicle windows. The temperature of the interior surfaces may even exceed the temperature of the occupant's skin if the exposure to sunlight is long-term and the ambient temperature outside the vehicle is high enough so that heat transfer from the vehicle interior to the vehicle exterior is impeded. In such cases, the vehicle interior surfaces may actually transfer additional heat to an occupant who is already hot. Thus, the vehicle occupant may find the heated surfaces very uncomfortable until the surfaces can be cooled, for example, using the vehicle air conditioning system.

SUMMARY

In one aspect of embodiments described herein, a vehicle component is provided. The component includes a first volume of phase change material and a second volume of phase change material spaced apart from the first volume of phase change material. The first volume of phase change material contains a greater mass of phase change material than the second volume of phase change material. The component also includes a thermally-conductive structure in direct contact with both the first volume of phase change material and the second volume of phase change material, so as to facilitate heat transfer between the first volume of phase change material and the second volume of phase change material.

In another aspect of embodiments described herein, a method of moderating a temperature of an exterior surface of a vehicle component is provided. The method includes steps of: providing a first volume of phase change material, providing a thermally-conductive structure in direct contact with the first volume of phase change material, and providing, as the exterior surface of the vehicle component, a second volume of phase change material in direct contact with the thermally-conductive structure, so as to facilitate thermal communication between the first volume of phase change material and the second volume of phase change material.

DETAILED DESCRIPTION

Vehicle interior surfaces may become hot to the touch due to sunlight exposure. Embodiments described herein relate to thermal communication structures configured for moderating the temperature of a surface in a vehicle passenger compartment which may be touched by an occupant or may come into contact with the occupant's skin. The thermal communication structures include a first volume of phase change material, a second volume of phase change material spaced apart from the first volume of phase change material, and a thermally-conductive structure in direct contact with both the first volume of phase change material and the second volume of phase change material, so as to facilitate heat transfer between the first volume of phase change material and the second volume of phase change material. The thermal communication structures may be incorporated into various vehicle components (such as the steering wheel, gear shift lever, armrests, etc.) located in the passenger compartment. The first volume of phase change material may be thermally isolated from the vehicle interior. The second volume of phase change material may cover an exterior surface of the vehicle component. Heat may then be transferred from the second volume of phase change material to the first volume of phase change material via the thermally-conductive structure, to cool the exterior surface of the component.

FIGS. 1-6 show various vehicle components incorporating embodiments of a thermal communication structure configured for moderating the temperature of an exterior surface of the vehicle component. The vehicle component may be positioned in a passenger compartment of the vehicle. The exterior surface may be a surface which may be touched by a vehicle occupant user during operation of the vehicle. Moderating the temperature of such surfaces may increase the comfort of the occupant in situations where, for example, the vehicle interior is exposed to sunlight on a hot day. Such exposure may heat the vehicle interior surfaces to a point where physical contact with the surfaces becomes uncomfortable for the occupant.

Embodiments of the thermal communication structure described herein generally include a first volume of phase change material (PCM) and a second volume of phase change material spaced apart from the first volume of phase change material. A thermally-conductive structure may be provided in intimate thermal contact with both the first volume of phase change material and the second volume of phase change material, so as to facilitate heat transfer between the first and second volumes of phase change material. The phase change material of the second volume of PCM may be the same phase change material as the material forming the first volume of PCM, or the second volume of PCM may be formed from a different phase change material.

PCM's are a class of known materials which can store and release energy through phase transition. The energy may be in the form of heat. The phase change materials usable in the vehicle components described herein may utilize a transition between the liquid and solid phases. When the PCM is in a solid phase, it absorbs heat as the external temperature rises. The temperature of the PCM will be the same as the external temperature until the melt point of the PCM is reached. When the external temperature reaches the melt point of the PCM, the PCM will begin to melt, or change phase from a solid to a liquid. During the transition from solid to liquid, the PCM will absorb large amounts of heat with almost no change in temperature. During this phase change period, the PCM may provide a cooling effect. A reverse process may occur as the external temperature drops. Then, a PCM in its liquid phase may release heat as the external temperature decreases and the PCM changes phase from a liquid phase to a solid phase, thereby providing a warming effect.

The forms of PCM suitable for use in the vehicle components described herein may depend on the particular application. For some applications, a PCM in the form of encapsulated PCM elements suspended in a flowable matrix may be desirable, to facilitate flow of the PCM into passages in a housing or enclosure. In other applications, the PCM may be molded or otherwise formed (or incorporated into a matrix which may be molded or formed) into a desired shape which will be maintained during normal use of the vehicle component. One source of phase change materials in various forms which may be suitable for the applications described herein is Microtek Laboratories, Inc., of Dayton, Ohio. This source offers a variety of PCM's in forms such as liquids, encapsulated elements incorporated into a powder or slurry, and other forms. This source also offers a PCM's in the form of a tape which may be applied to a surface of a thermally-conductive structure, and which may be usable for the relatively thinner second volume of phase change material described herein. Phase change materials are also readily available from other sources. Materials usable for the purposes described herein and which may be contained or encapsulated into various shapes may include paraffins (wax), fatty acids (oils), polyglycols, salt hydrates, water solutions, and/or other materials.

In one or more arrangements, embodiments of the thermal communication structure described herein may be incorporated into vehicle components which may be physically touched by a vehicle occupant (or come into contact with the skin of the occupant) during normal usage of the vehicle. Such components include, for example, the steering wheel, armrests, and gear shift handle. Embodiments of the thermal communication structure may also be incorporated into other user-accessible vehicle components.

The first volume of phase change material may contain a greater mass (in some embodiments, a substantially greater mass) of phase change material than the second volume of phase change material. The first volume of phase change material may be positioned physically spaced apart from the second volume of PCM, and may be thermally connected to the second volume of PCM by the thermally-conductive structure. The first volume of phase change material may be enclosed within a structure defined by one or more surfaces of the thermally-conductive structure and one or more surfaces of a thermally-insulative wall or structure. This arrangement may aid in thermally shielding the first volume of phase change material from heat sources other than the thermally-conductive structure, thereby helping to prevent the heat-absorbing capacity of the first volume of phase change material from being diminished by heat from other sources. For example, in the structure shown in FIGS. 5A-5D, the first volume 80$b$ of phase change material may be enclosed within a cavity defined by a first wall 80$c$ and a housing 80$a$. Thus, the primary source of heat transferred to first PCM volume 80$b$ is the thermally conductive structure formed by first wall 80$c$ and fins 80$e$.

The second volume of PCM may be relatively thin compared to the first volume of PCM. In one or more arrangements, the second volume of PCM is in the form of a tape or thin sheet incorporating PCM elements. The second volume of PCM may be applied to (and be in direct contact with) an outer or exterior surface of a vehicle component which may be physically touched or contacted by the skin of a vehicle occupant. This exterior surface of the vehicle component may be a surface of the thermally-conductive structure which would otherwise be exposed to the environment of the vehicle interior. Thus, this surface may normally become heated along with the remainder of the vehicle interior due to elevated temperatures exterior of the vehicle, and also due to sunlight and radiation reaching the interior.

The relatively lower-mass second volume of PCM may absorb heat energy relatively rapidly, and will begin to transfer heat (via the thermally-conductive structure) to the first volume of PCM. The relatively higher-mass first volume of PCM may have a much greater capacity to absorb and store heat energy. Thus, the first volume of PCM may continue to absorb heat collected by the second volume of PCM for a relatively long period of time while the greater PCM mass of the first volume changes phase. This ongoing heat transfer provides cooling of the second volume of PCM.

The thermally-conductive structure may be structured and positioned with respect to the first and second volumes of phase change material so as to maximize a surface area over which the first and second volumes of phase change material may thermally communicate. In one or more arrangements, the thermally-conductive structure may be structured to maximize the area of direct contact between the thermally-conductive structure and the first volume of PCM, and also between the thermally-conductive structure and the second volume of PCM. "Direct contact" refers to actual, physical contact between the first volume of phase change material and the thermally-conductive structure, and between the second volume of phase change material and the thermally-conductive structure. This arrangement may aid in maximizing the degree, rate, and efficiency heat transfer between the first and second volumes of PCM.

In one or more arrangements, portions of the thermally-conductive structure may be immersed in the first volume of PCM. In these arrangements, the first volume of PCM may be in physical contact with the portions of the thermally-conductive structure along the entire areas of the portions of the structure located inside the first volume of PCM. For example, in FIG. 3B, the portions of the pins 60c located inside the second volume 351 of PCM may be in contact with the PCM along the entire exterior surface areas of the immersed pin portions. This arrangement may aid in maximizing surface area available for heat transfer.

In one or more arrangements, the thermally-conductive structure is formed from one or one or more metallic materials. The metallic materials used may have relatively high thermal conductivities, to promote efficient transfer of heat. Wall thicknesses of the elements of the thermally-conductive structure may be thin enough to store as little heat as possible while still meeting structural and other engineering requirements.

In one or more arrangements, the thermally-conductive structure may include a first wall, and both the first volume of phase change material and the second volume of phase change material may be in direct contact with the first wall. The first volume of phase change material may be positioned on a first side of the first wall, while the second volume of phase change material is positioned on a second side of the first wall opposite the first side, and physically spaced apart from the first volume of phase change material.

In one or more arrangements, the thermally-conductive structure may include one or more heat transfer projections extending from the first side of the first wall in a direction toward the first volume of phase change material. In addition, the heat transfer projections may be in direct contact with the first volume of phase change material. The heat transfer projections may take various forms, depending on the requirements of a particular application.

Figure 1A:
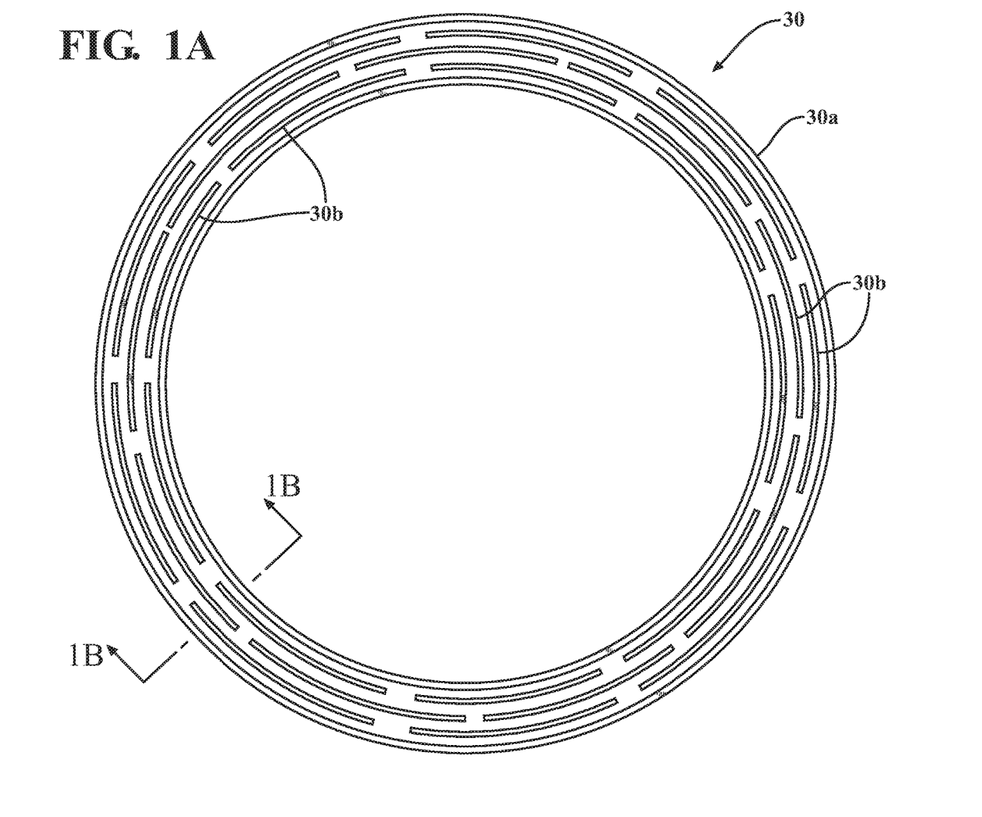
FIG. 1A is a schematic plan view of a part of a steering wheel including a thermally-conductive structure in accordance with an embodiment described herein.

For example, FIGS. 1A-3B show various embodiments of the thermal communication structure incorporated into a vehicle steering wheel. FIG. 1A is a schematic plan view of a part 30 of a steering wheel including a thermally-conductive structure in accordance with an embodiment described herein. FIG. 1B is a schematic cross-sectional view of a portion of the steering wheel part 30 shown in FIG. 1A. FIG. 1C is a schematic cross-sectional view of a portion of an steering wheel shell 32 assembled using a pair of steering wheel parts 30-1 and 30-2 as shown in FIGS. 1A and 1B.

Figure 1B:
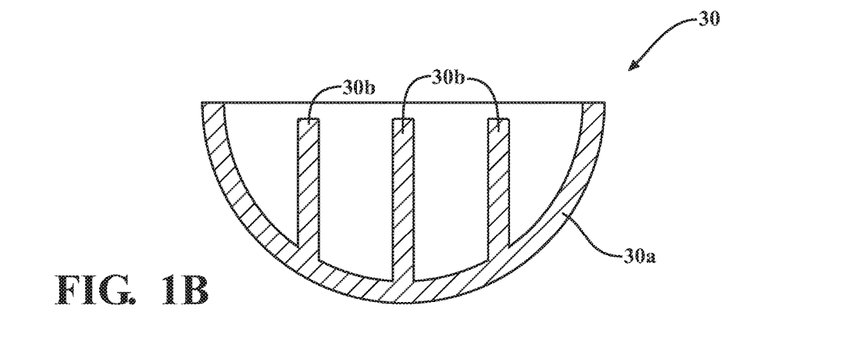
FIG. 1B is a schematic cross-sectional view of a portion of the steering wheel part shown in FIG. 1A.
Figure 1C:
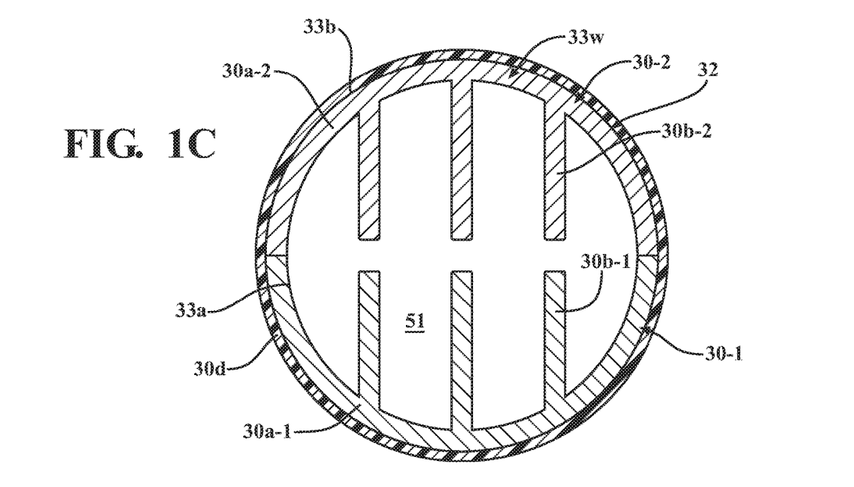
FIG. 1C is a schematic cross-sectional view of a portion of an steering wheel assembled using a pair of steering wheel parts as shown in FIGS. 1A and 1B.

In the embodiment shown in FIGS. 1A-1C, the steering wheel part 30 is circular in overall shape (FIG. 1A) and has a semi-circular cross-section (FIG. 1B). This shape enables the steering wheel part 30 to be fabricated from a metal or other thermally-conductive material using a molding or casting process. Steering wheel part 30 includes a first wall 30a which may be a portion of an outer wall of a rim of the steering wheel shell 32. Referring to FIG. 1B, one or more heat transfer projections 30b extend from a first side of the first wall 30a in a direction toward what will be an interior of the assembled steering wheel. The interior of the assembled steering wheel 32 will contain the first volume 51 of phase change material as described herein and as shown in FIG. 1C.

As seen in FIGS. 1A and 1B, heat transfer projections 30b may be in the form of one or more fins attached to interior surfaces of the first wall 30a. In one or more arrangements, the fins may extend parallel to each other. The fins 30b may be formed separately from the first wall 30a and attached to the first wall. Alternatively, the fins 30b may be formed integrally with the first wall (i.e., the fins may be formed in the same operation as the first wall 30a and of the same material as the first wall, so that the first wall 30a and the fins 30b form a continuous block of material). The fins may also have shapes other than those shown in FIGS. 1A-1C.

Steering wheel part 30 may also have one or more fill holes or portals (not shown) formed therein to enable a flowable PCM to be introduced into the steering wheel interior after the steering wheel parts 30-1 and 30-2 (FIG. 1C) are attached to each other, as described below. Parameters such as the number of fins, the shapes of the fins, the thicknesses, lengths, and depths of the fins, and the spacing between the fins and between the fins and the first wall 30a may be determined by heat transfer requirements, the casting properties of the material, the flow requirements of phase change material used to fill the steering wheel interior, and other pertinent factors.

As seen in FIG. 1C, a pair of parts 30-1 and 30-2 similar to steering wheel part 30 may be joined together to form a hollow steering wheel shell 32. The assembled steering wheel shell 32 may have a combined first wall 33w including a combined first (interior) side or surface 33a and a second combined (exterior) side or surface 33b opposite the surface 33a. The parts 30-1 and 30-2 may be joined using any method suitable for the purposes described herein. For example, welding or mechanical fasteners may be used. After the parts 30-1 and 30-2 are secured together, a flowable PCM 51 may be injected into the steering wheel interior. The fins 30b-1 and 30b-2 may be immersed in the PCM of the first volume 51 of PCM after the PCM has been introduced into the interior of the wheel shell 32.

The flowable PCM may be structured and applied so as to fill the entire interior of the wheel not occupied by the fins 30b-1 and 30b-2, so that the direct contact area between the PCM 51, the fins 30b-1, 30b-2, and the first surface 33a of combined first wall 33w is maximized. The fill holes may then be sealed in any suitable manner. After the wheel interior has been filled, a second volume 30d of PCM may be applied to the combined second (or exterior) surface 33b of the combined first wall 33w. As described previously, the second volume 30d of PCM may be a relatively thin layer of PCM (for example, one or more sheets or strips of PCM tape wound around the surface 33b of the combined first wall 33w). Thus, in this embodiment of the steering wheel, the combined first wall 33w includes a first portion 30a-1 and a second portion 30a-2 attached to the first portion 30a-1 to form at least part of the combined first wall 33w. In addition, at least one heat transfer projection 30b-1 is attached to the first wall first portion 30a-1 and is in direct contact with the first volume 51 of phase change material when the phase change material 51 is positioned in the steering wheel interior. Also, at least one heat transfer projection 30b-2 is attached to the first wall second portion 30a-2 and is in direct contact with the first volume 51 of phase change material when the phase change material 51 is positioned in the steering wheel interior.

The second volume 30d of PCM may be applied so as to provide intimate thermal contact with the combined first wall exterior surface 33b. The wheel shell 32 may form the thermally-conductive structure enabling thermal communication between the first volume 51 of PCM and the second volume 30d of PCM. In one or more arrangements, an entire outer or exposed surface 33b of the combined first wall 33w may be covered by the second volume 30d of PCM. This helps ensure cooling of all outer surfaces of the wheel shell 32. As the relatively smaller second volume 30d of PCM is heated, heat may be rapidly and efficiently transferred from the second volume 30d of PCM via the thermally-conductive wheel shell 32 to the first volume 51 of PCM, thereby cooling the second volume 30d of PCM.

Figure 2A:
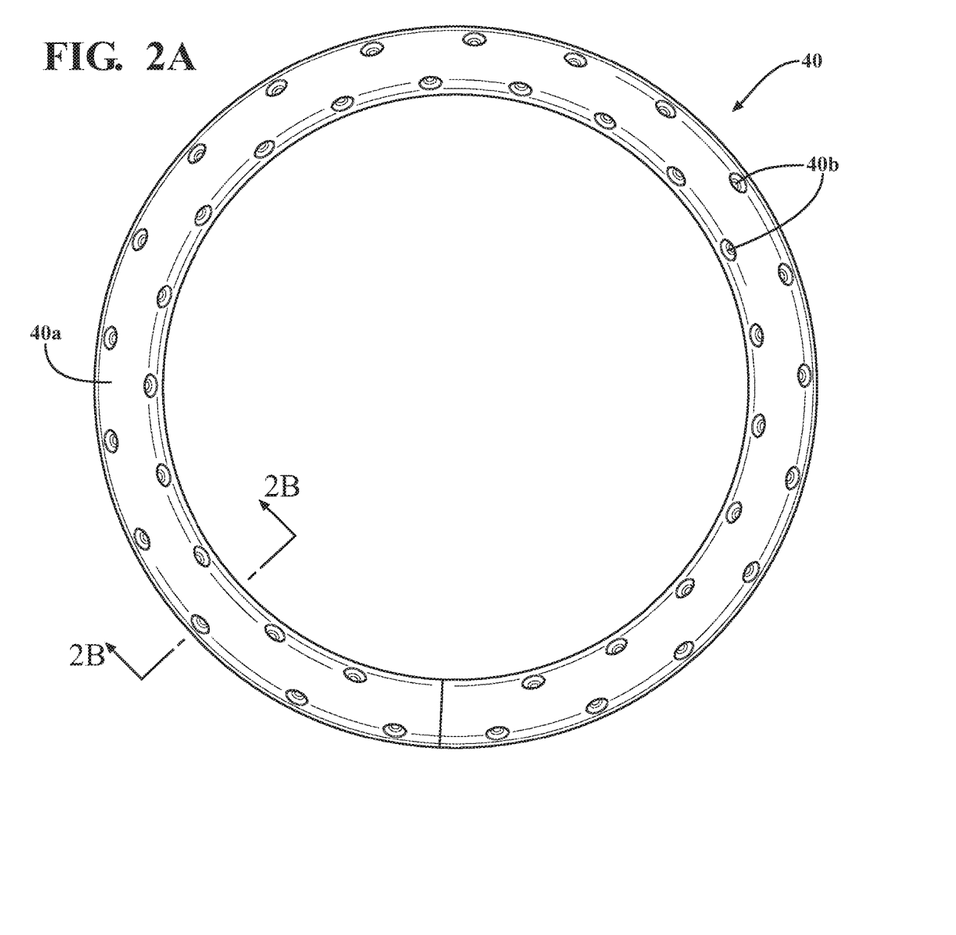
FIG. 2A is a schematic plan view of a part of a steering wheel in accordance with another embodiment described herein.
Figure 2B:
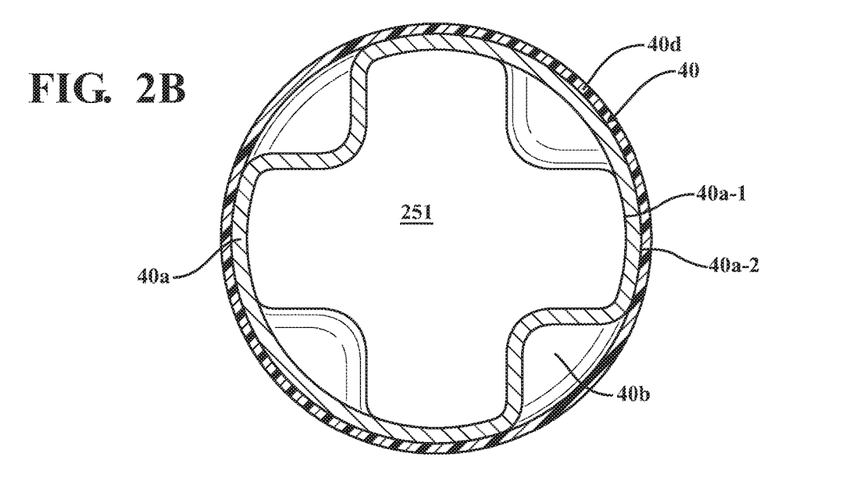
FIG. 2B is a schematic cross-sectional view of a steering wheel incorporating the steering wheel part shown in FIG. 2A.

FIG. 2A is a schematic plan view of a part 40 of a steering wheel in accordance with another embodiment described herein. FIG. 2B is a schematic cross-sectional view of a steering wheel incorporating the steering wheel part shown in FIG. 2A. FIG. 2A shows a hollow steering wheel shell 40 similar to shell 32 described previously with respect to FIGS. 1A-1C. Shell 40 may be formed as previously described, or the shell may be formed in any other suitable manner. In one example, the shell 40 may be formed from a length of hollow tubing which is bent into the required shape. The tubing may then be further processed as required after bending. As in the embodiment shown in FIGS. 1A-1C, the steering wheel shell forms a portion of the thermally-conductive structure. Shell 40 may have a first wall 40a and heat transfer projections in the form a plurality of spaced-apart dimples or depressions 40b formed in the first wall 40a along an extent of the wall. The number, sizes, and extent of the depressions 40b along the first wall may be determined by wall material properties, wall thickness, and other relevant parameters.

First wall 40a may have a first (interior) side or surface 40a-1 and a second (exterior) side or surface 40a-2 opposite the first surface. A first volume 251 of PCM may be introduced into the interior of the shell 40 as previously described. The depressions 40b may be structured so that the first volume 251 of PCM is in direct contact with the first surface 40a-1 of the first wall 40a along the depressions. The stretching of the material of first wall 40a produced by formation of the depressions 40b increases the direct contact area between the first wall 40a and the first volume 251 of PCM. The depressions 40b may be formed prior to introduction of the PCM 251 into the shell interior. Alternatively, the depressions 40b may be formed after introduction of the PCM 251 into the shell interior. In this fabrication mode, formation of the depressions may produce localized displacement and pressurization of the PCM 251, which may help ensure close physical contact between the PCM 251 and the first wall 40a. The second volume 40d of PCM may be applied to first wall second surface 40a-2 as described previously.

Figure 3A:
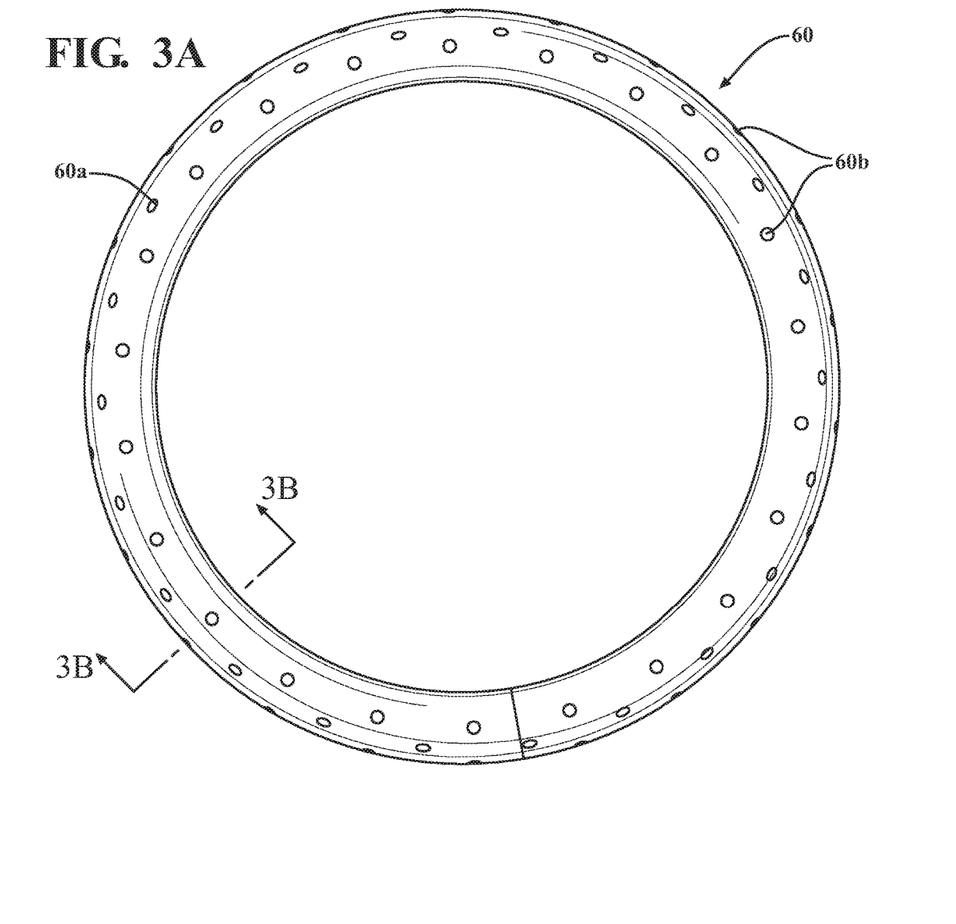
FIG. 3A is a schematic plan view of a part of a steering wheel in accordance with another embodiment described herein.
Figure 3B:
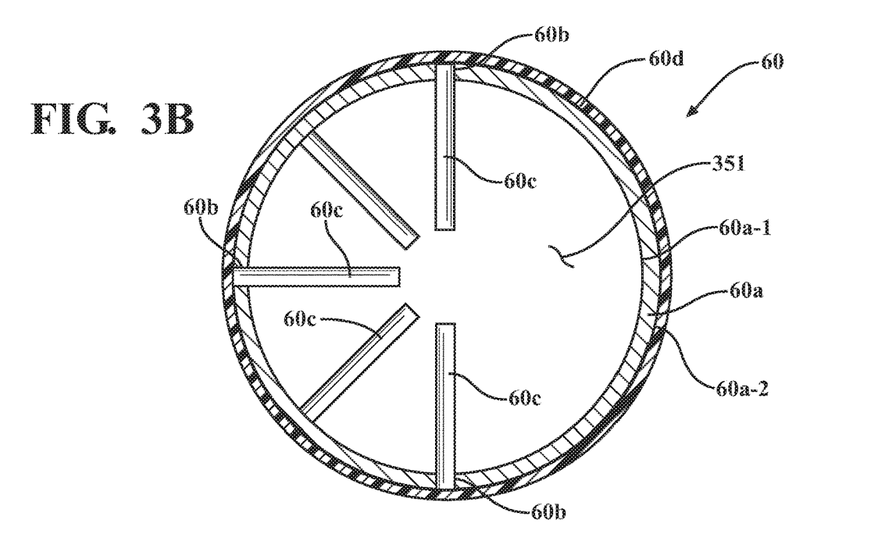
FIG. 3B is a schematic cross-sectional view of a steering wheel incorporating the steering wheel part shown in FIG. 3A.

FIG. 3A is a schematic plan view of a part of a steering wheel in accordance with another embodiment described herein. FIG. 3B is a schematic cross-sectional view of a steering wheel incorporating the steering wheel part shown in FIG. 3A. FIG. 3A shows a hollow steering wheel shell 60 which may be fabricated in any suitable manner, as previously described. Shell 60 may have a first wall 60a defining an interior of the shell. First wall 60a may have a first (interior) side or surface 60a-1 and a second (exterior) side or surface 60a-2 opposite the first surface. As in the embodiment shown in FIGS. 1A-1C, the steering wheel shell 60 forms a portion of the thermally-conductive structure.

In the embodiment shown in FIGS. 3A-3B, first wall 60a also includes a plurality of spaced apart through-holes 60b formed therealong. In addition, heat transfer projections in the form of one or more separately-formed pins or stakes 60c are provided, with each pin 60c being mounted in an associated through hole 60b of the plurality of through holes. Each pin 60c extends from the first side 60a-1 of the first wall 60a to directly contact the first volume 351 of phase change material. In an alternative embodiment, through-slots may be cut into first wall 60a and one or more suitably-shaped fins may be inserted into the slots to extend into the interior of the shell 60.

Pins 60c may be attached to first wall 60a in a manner designed to help ensure intimate thermal contact between the pins and the first wall 60a. In one embodiment, an end of each pin 60c may be structured to form an interference fit with edges of an associated hole 60b in which the pin is mounted. Alternative attachment methods may also be used. Ends of the pins 60c may also be structured to help ensure intimate contact between the ends of the pins and the second volume 60d of PCM applied to shell second surface 60a-2, so that heat may be transferred from the second volume 60d of PCM along the pins 60c and into the first volume 351 of PCM. Thus, pins 60c may receive and transfer heat from both the second volume 60d of PCM and the first wall 60a.

Any desired number of pins 60c may be inserted into the shell 60 as described. As seen in FIG. 3B, pins may be inserted along any of multiple directions into the shell 60 as desired. In one or more arrangements, the pins 60c may be inserted into holes which are evenly or substantially evenly distributed along an extent of the shell 60, to help ensure heat transfer to as much of the first volume 351 of PCM as possible. Holes 60b may be aligned with each other, or staggered or formed into any pattern suitable for distributing the transferred heat as evenly as possible through the first volume 351 of PCM, depending on the sizes of the pins 60c, the cross-sectional dimensions of the steering wheel shell 60, and other pertinent parameters. Control of the number of pins 60c inserted into the shell 60 also provides a means of adjusting the amount and distribution of heat transfer into the first volume 351 of PCM, if so desired.

The pins 60c may be inserted into the shell interior prior to introduction of the PCM 351 into the shell interior. Alternatively, the pins 60c may be inserted after introduction of the PCM 351 into the shell interior. In this fabrication mode, insertion of the pins 60c may produce localized displacement of the PCM 351, which may help ensure close physical contact between the PCM 351 and the pins 60c. The second volume 60d of PCM may be applied to first wall second surface 60a-2 as described previously.

Figure 4:
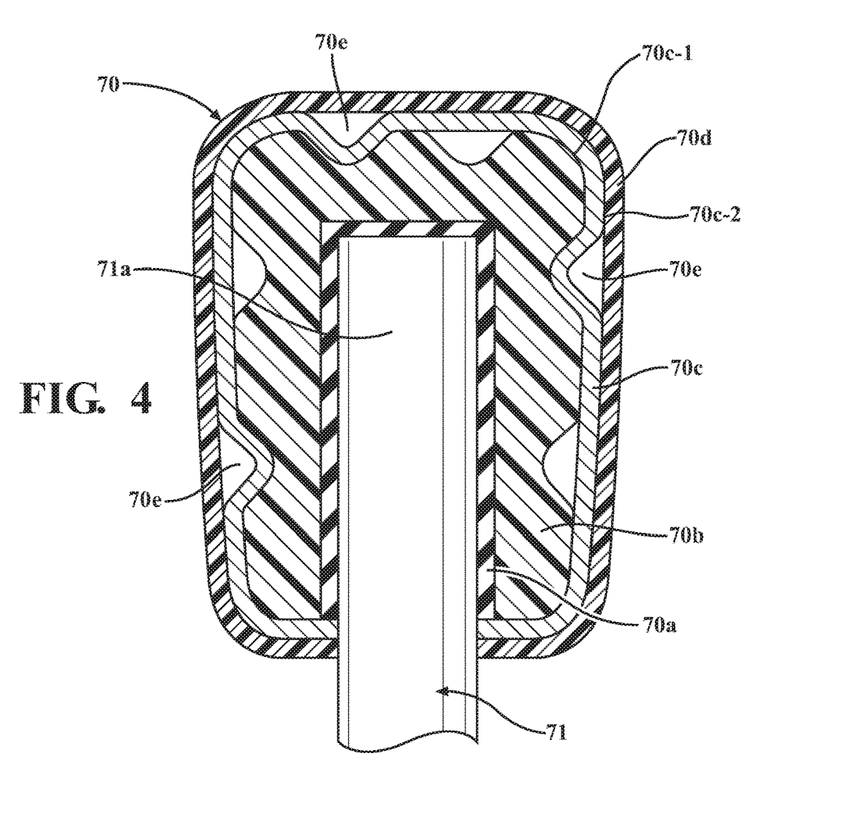
FIG. 4 is a schematic cross-sectional view of a handle for a gear shift lever incorporating a thermal communication structure in accordance with an embodiment described herein.

FIG. 4 is a schematic cross-sectional view of a handle 70 for a gear shift lever incorporating a thermal communication structure in accordance with an embodiment described herein. A first wall 70c may have a first (interior) side or surface 70c-1 and a second (exterior) side or surface 70c-2 opposite the first surface. In this embodiment, the first wall 70c may have heat transfer projections in the form of depressions or dimples 70e similar to the depressions shown and described with regard to FIGS. 2A and 2B. Depressions 70e and the remainder of surface 70c-1 may be in intimate thermal or direct contact with the first volume 70b of PCM.

A housing 70a may be provided for attachment to an end 71a of the gear shift lever 71. The first wall 70c may be structured for attachment to the housing so as to form an enclosure which surrounds or encapsulates the first volume 70b of PCM positioned between the housing 70a and the first wall 70c. PCM 70b may be in any form suitable for occupying as much of the space between housing 70a and first wall 70c as possible. In a particular embodiment, the first volume 70b of PCM may be a solid block shaped to fit within the spaces between housing 70a and first wall 70c. Depressions 70e may be formed in first wall 70c either before or after positioning of the first volume 70b of PCM between housing 70a and first wall 70c.

Housing 70a may be formed from a thermally-insulative material, so that heat transferred to the first volume 70b of PCM will come primarily from the second volume 70d of PCM via the thermally-conductive first wall 70c. The second volume 70d of PCM may be applied to first wall second surface 70c-2 as described previously. The elements shown may be assembled into a single part which may be attached to the end 71a of the gear shift lever.

Figure 5A:
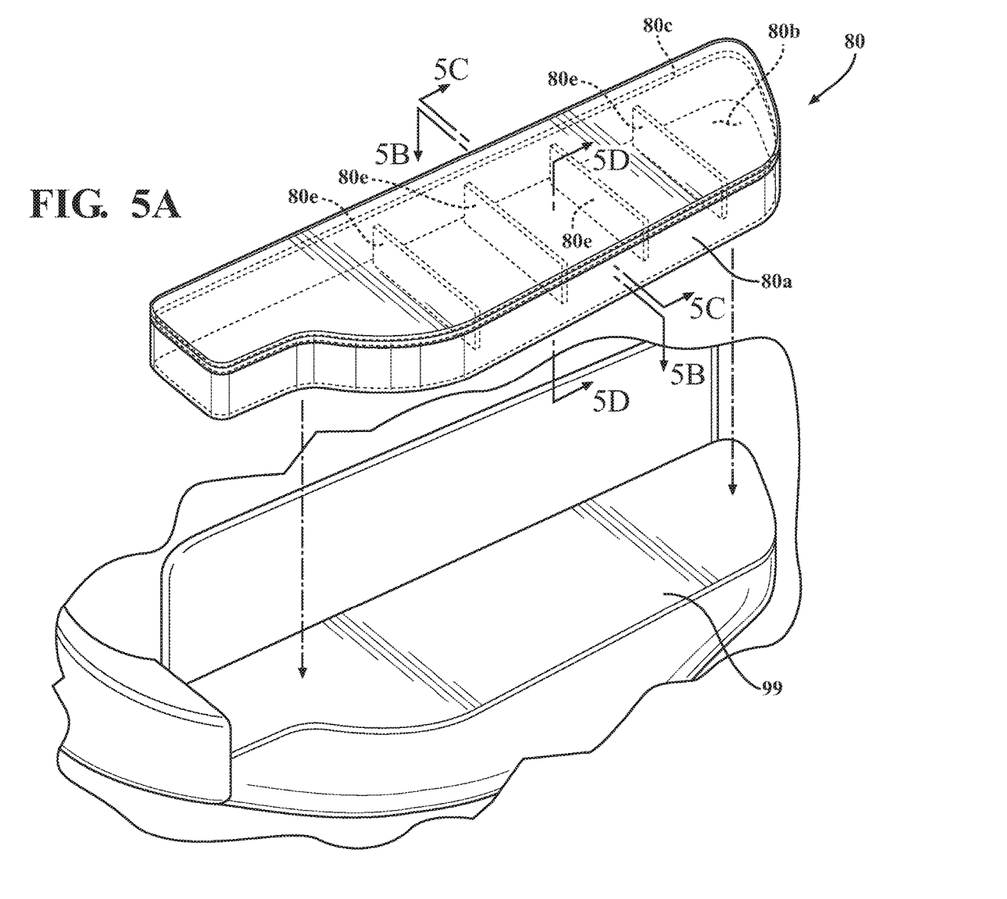
FIG. 5A is a schematic perspective view of an armrest cover incorporating a thermal communication structure in accordance with an embodiment described herein.
Figure 5B:
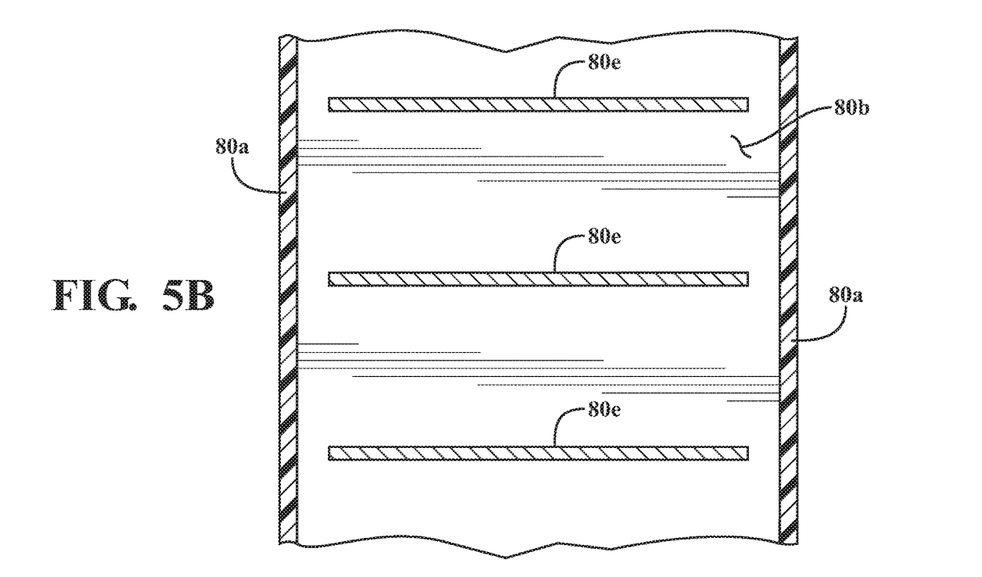
FIG. 5B is a schematic cross-sectional plan view of a portion of the armrest cover shown in FIG. 5A.
Figure 5C:
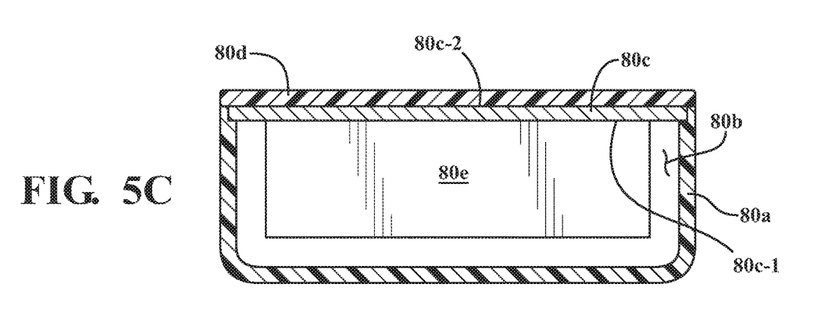
FIG. 5C is a schematic cross-sectional end view of a portion of the armrest cover shown in FIG. 5A.
Figure 5D:
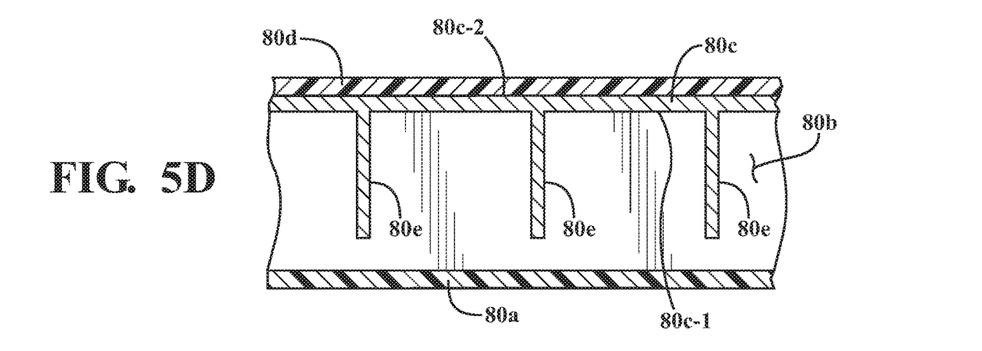
FIG. 5D is a schematic cross-sectional side view of a portion of the armrest cover shown in FIG. 5A.

FIG. 5A is a schematic perspective view of an armrest cover 80 incorporating a thermal communication structure in accordance with an embodiment described herein. FIG. 5B is a schematic cross-sectional plan view of a portion of the armrest cover 80 shown in FIG. 5A. FIG. 5C is a schematic cross-sectional end view of a portion of the armrest cover 80 shown in FIG. 5A. FIG. 5D is a schematic cross-sectional side view of a portion of the armrest cover shown in FIG. 5A. As seen in FIG. 5A, the armrest cover 80 may be positioned and secured on a vehicle armrest 99 or center console (not shown). The armrest cover 80 in FIG. 5A is structured to be attachable to a driver side armrest.

In the embodiment shown in FIGS. 5B-5D, the armrest cover 80 has a first wall 80c with a first (inner) surface 80c-1 and a second (outer) surface 80c-2 opposite the first surface 80c-1. A housing 80a may be provided for attachment to a surface of the armrest, as shown in FIG. 5A. The housing 80a may define a cavity for receiving the first volume 80b of PCM. The first wall 80c may be structured for attachment to the housing 80a so as to form an enclosure which surrounds or encapsulates the first volume 80b of PCM positioned between the housing 80a and the first wall 80c. Heat transfer projections in the form of one or more fins 80e may extend from first wall first surface 80c-1 toward the first volume 80b of PCM, where the fins directly contact the PCM. The fins 80e may be immersed in the PCM of the first volume 80b of PCM after the PCM has been introduced into the interior of the enclosure formed by the housing 80a and the wall 80c.

PCM 80b may be in any form suitable for occupying as much of the space between housing 80a and first wall 80c as possible, and also the space between the fins 80e. Housing 80a may be formed from a thermally-insulative material, so that heat transferred to the first volume 80b of PCM will come primarily from the second volume 80d of PCM via the thermally-conductive first wall 80c and fins 80e. The second volume 80d of PCM may be applied to first wall second surface 80c-2 as described previously. The elements shown may be assembled into a single part 80 which may be attached to the armrest.

Figure 6:
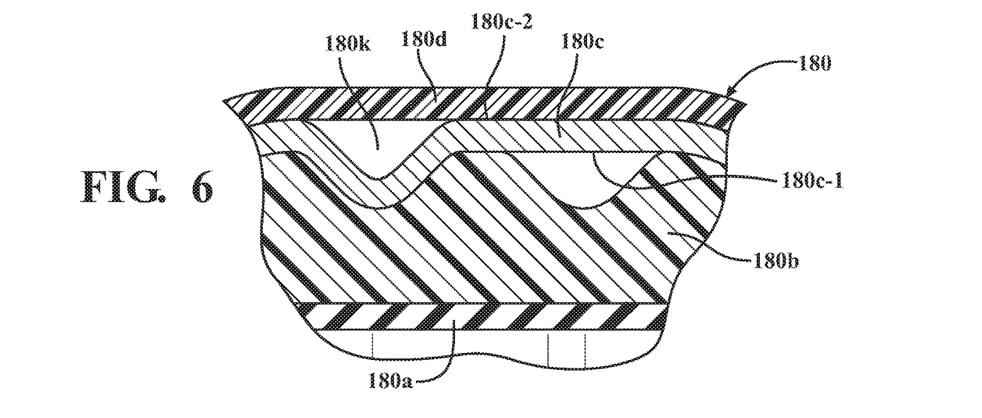
FIG. 6 is a schematic cross-sectional side view of a portion of an armrest cover incorporating a thermal communication structure in accordance with an alternative embodiment described herein.

FIG. 6 is a schematic cross-sectional side view of a portion of an armrest cover 180 similar to that shown in FIGS. 5A-5D. Armrest cover 180 may have a housing 180a and a first wall 180c connected to the housing 180a so as to form an enclosure structured to contain a first volume 180b of PCM, as previously described. First wall 180c may have a first surface 180c-1 structured to face toward first volume 180b of PCM, and a second surface 180c-2 opposite the first surface.

In the armrest cover 180, heat transfer projections in the form of depressions 180k may be formed in the first wall 180c. Depressions 180k may be similar to the depressions previously described with respect to FIGS. 2A and 2B. The depressions may be formed before or after the positioning of the first volume 180b of PCM in the housing 180a. The number, sizes, and extent of the depressions 40b along the first wall may be determined by wall material properties, wall thickness, and other relevant parameters. The depressions 180k may be structured so that the first volume 180b of PCM is in direct contact with the first surface 180c-1 of the first wall 180c along the depressions. The structure of the embodiment shown in FIG. 6 may otherwise be the same as the embodiment shown in FIGS. 5A-5D.

In the preceding detailed description, reference is made to the accompanying figures, which form a part hereof. In the figures, similar symbols typically identify similar components, unless context or the description specifics dictate otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A handle for a gear shift lever, the handle comprising:
a housing attachable to the gear shift lever;
a thermally-conductive first wall coupled to the housing;
a first volume of phase change material positioned between the housing and the first wall;
a second volume of phase change material spaced apart from the first volume of phase change material,
the first volume of phase change material containing a greater mass of phase change material than the second volume of phase change material,
and wherein both the first volume of phase change material and the second volume of phase change material are in direct contact with the thermally-conductive first wall.

2. The handle of claim 1 wherein the thermally-conductive first wall comprises a metallic material.

3. The handle of claim 1 wherein the first wall further comprises at least one heat transfer projection extending from a first side of the first wall in a direction toward the first volume of phase change material, and wherein the at least one heat transfer projection is in direct contact with the first volume of phase change material.

4. The vehicle component of claim 3 wherein the at least one heat transfer projection comprises a plurality of spaced apart depressions formed in the first wall, and wherein the first volume of phase change material is in direct contact with surfaces of the first side of the first wall along the plurality of spaced apart depressions.

5. The vehicle component of claim 3 wherein the at least one heat transfer projection comprises at least one pin attached to the first wall, the at least one pin extending from the first side of the first wall to directly contact the first volume of phase change material.

6. The vehicle component of claim 5 wherein the first wall has a plurality of spaced apart through-holes formed therealong and wherein the at least one heat transfer projection comprises a plurality of pins, each pin being mounted in an associated through hole of the plurality of through holes, each pin extending from the first side of the first wall to directly contact the first volume of phase change material.

7. The vehicle component of claim 3 wherein the at least one heat transfer projection comprises at least one fin attached to the first wall.

8. The vehicle component of claim 7 wherein the at least one heat transfer projection comprises a plurality of fins attached to the first wall and extending parallel to each other.

9. The vehicle component of claim 7 wherein the at least one fin is formed integrally with the first wall.

10. The vehicle component of claim 3 wherein the second volume of phase change material is positioned on a second side of the first wall opposite the first side of the first wall.

11. The vehicle component of claim 1 wherein the housing is formed from a thermally-insulative material.

* * * * *